United States Patent
Chadha et al.

(10) Patent No.: US 11,347,708 B2
(45) Date of Patent: May 31, 2022

(54) SYSTEM AND METHOD FOR UNSUPERVISED DENSITY BASED TABLE STRUCTURE IDENTIFICATION

(71) Applicant: salesforce.com, inc., San Francisco, CA (US)

(72) Inventors: Ankit Chadha, Mountain View, CA (US); Zeyuan Chen, Mountain View, CA (US); Caiming Xiong, Menlo Park, CA (US); Ran Xu, Palo Alto, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 219 days.

(21) Appl. No.: 16/680,302

(22) Filed: Nov. 11, 2019

(65) Prior Publication Data
US 2021/0141781 A1    May 13, 2021

(51) Int. Cl.
G06F 16/30    (2019.01)
G06F 16/22    (2019.01)
G06F 16/28    (2019.01)

(52) U.S. Cl.
CPC ........ *G06F 16/2282* (2019.01); *G06F 16/285* (2019.01)

(58) Field of Classification Search
CPC ........................ G06F 16/2282; G06F 16/285
USPC ........ 707/609, 687, 705, 769, 790, 813, 821
See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |

(Continued)

OTHER PUBLICATIONS

"Agglomerative Hierarchical Clustering," retrieved on Feb. 26, 2020 from https://www.datanovia.com/en/lessons/agglomerative-hierarchical-clustering/, pp. 1-13.

(Continued)

*Primary Examiner* — Sana A Al-Hashemi
(74) *Attorney, Agent, or Firm* — Haynes and Boone, LLP

(57) ABSTRACT

Embodiments described herein provide unsupervised density-based clustering to infer table structure from document. Specifically, a number of words are identified from a block of text in an noneditable document, and the spatial coordinates of each word relative to the rectangular region are identified. Based on the word density of the rectangular region, the words are grouped into clusters using a heuristic radius search method. Words that are grouped into the same cluster are determined to be the element that belong to the same cell. In this way, the cells of the table structure can be identified. Once the cells are identified based on the word density of the block of text, the identified cells can be expanded horizontally or grouped vertically to identify rows or columns of the table structure.

20 Claims, 14 Drawing Sheets

(56) References Cited

U.S. PATENT DOCUMENTS

| | | | |
|---|---|---|---|
| 10,565,318 B2 | 2/2020 | Bradbury | |
| 10,565,493 B2 | 2/2020 | Merity et al. | |
| 2007/0239707 A1* | 10/2007 | Collins | G06F 16/35 707/999.005 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0246972 A1* | 8/2018 | Shukla | G06F 16/9535 |
| 2018/0253496 A1* | 9/2018 | Natchu | G06F 16/951 |
| 2018/0268287 A1 | 9/2018 | Johansen et al. | |
| 2018/0268298 A1 | 9/2018 | Johansen et al. | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0365320 A1* | 12/2018 | Venkataraman | G06F 16/3349 |
| 2018/0373682 A1 | 12/2018 | McCann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Hosseini-Asl et al. | |
| 2019/0295530 A1 | 9/2019 | Hosseini-Asl et al. | |
| 2019/0355270 A1 | 11/2019 | McCann et al. | |
| 2019/0362020 A1 | 11/2019 | Paulus et al. | |
| 2019/0362246 A1 | 11/2019 | Lin et al. | |
| 2020/0005765 A1 | 1/2020 | Zhou et al. | |
| 2020/0005780 A1 | 1/2020 | Lu et al. | |

OTHER PUBLICATIONS

Ester et al., "A Density-Based Algorithm for Discovering Clusters in Large Spatial Databases with Noise," KDD-96 Proceedings, pp. 226-231 (1996).

Klampfl et al., "A Comparison of Two Unsupervised Table Recognition Methods from Digital Scientific Articles," pp. 1-14, 2014.

* cited by examiner

| Country/Heading | Cohesion Fund EURbn | ERDF Convergence EURbn | Total EURbn |
|---|---|---|---|
| Bulgaria | 2.3 | 3.2 | 5.5 |
| Cyprus | 0.21 | 0 | 0.21 |
| Czech Republic | 8.8 | 13.4 | 22.2 |
| Estonia | 1.1 | 1.9 | 3.0 |
| Hungary | 8.6 | 11.2 | 19.8 |
| Latvia | 1.5 | 2.4 | 3.9 |
| Lithuania | 2.3 | 3.4 | 5.7 |
| Malta | 0.28 | 0.44 | 0.72 |
| Poland | 22 | 33 | 55 |
| Romania | 6.5 | 9 | 15.5 |
| Slovakia | 4 | 6 | 10 |
| Slovenia | 1.4 | 1.9 | 3.3 |
| Technical Assistance | | 0.87 | |
| TOTAL | 58.99 | 86.70 | 145.69 |

FIG. 5A

| Country/Heading | Cohesion Fund EURbn | ERDF Convergence EURbn | Total EURbn |
|---|---|---|---|
| Bulgaria | 2.3 | 3.2 | 5.5 |
| Cyprus | 0.21 | 0 | 0.21 |
| Czech Republic | 8.8 | 13.4 | 22.2 |
| Estonia | 1.1 | 1.9 | 3.0 |
| Hungary | 8.6 | 11.2 | 19.8 |
| Latvia | 1.5 | 2.4 | 3.9 |
| Lithuania | 2.3 | 3.4 | 5.7 |
| Malta | 0.28 | 0.44 | 0.72 |
| Poland | 22 | 33 | 55 |
| Romania | 6.5 | 9 | 15.5 |
| Slovakia | 4 | 6 | 10 |
| Slovenia | 1.4 | 1.9 | 3.3 |
| Technical Assistance | | 0.87 | |
| TOTAL | 58.99 | 86.70 | 145.69 |

FIG. 5B

| Country/Heading | Cohesion Fund EURbn | ERDF Convergence EURbn | Total EURbn |
|---|---|---|---|
| Bulgaria | 2.3 | 3.2 | 5.5 |
| Cyprus | 0.21 | 0 | 0.21 |
| Czech Republic | 8.8 | 13.4 | 22.2 |
| Estonia | 1.1 | 1.9 | 3.0 |
| Hungary | 8.6 | 11.2 | 19.8 |
| Latvia | 1.5 | 2.4 | 3.9 |
| Lithuania | 2.3 | 3.4 | 5.7 |
| Malta | 0.28 | 0.44 | 0.72 |
| Poland | 22 | 33 | 55 |
| Romania | 6.5 | 9 | 15.5 |
| Slovakia | 4 | 6 | 10 |
| Slovenia | 1.4 | 1.9 | 3.3 |
| *Technical Assistance* | | 0.87 | 0.87 |
| TOTAL | 58.99 | 86.70 | 145.69 |

*FIG. 5C*

| Country/Heading | Cohesion Fund EURbn | ERDF Convergence EURbn | Total | EURbn |
|---|---|---|---|---|
| Bulgaria | 2.3 | 3.2 | 5.5 | |
| Cyprus | 0.21 | 0 | 0.21 | |
| Czech Republic | 8.8 | 13.4 | 22.2 | |
| Estonia | 1.1 | 1.9 | 3.0 | |
| Hungary | 8.6 | 11.2 | 19.8 | |
| Latvia | 1.5 | 2.4 | 3.9 | |
| Lithuania | 2.3 | 3.4 | 5.7 | |
| Malta | 0.28 | 0.44 | 0.72 | |
| Poland | 22 | 33 | 55 | |
| Romania | 6.5 | 9 | 15.5 | |
| Slovakia | 4 | 6 | 10 | |
| Slovenia | 1.4 | 1.9 | 3.3 | |
| *Technical Assistance* | | *0.87* | | |
| TOTAL | 58.99 | 86.70 | 145.69 | |

*FIG. 5D*

| Country/Heading | Cohesion Fund EURbn |
|---|---|
| Bulgaria | 2.3 |
| Cyprus | 0.21 |
| Czech Republic | 8.8 |
| Estonia | 1.1 |
| Hungary | 8.6 |
| Latvia | 1.5 |
| Lithuania | 2.3 |
| Malta | 0.28 |
| Poland | 22 |

FIG. 11

SYSTEM AND METHOD FOR UNSUPERVISED DENSITY BASED TABLE STRUCTURE IDENTIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to machine learning models for processing unstructured data, and more specifically, to systems and methods for unsupervised density based table structure identification.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Documents often contain table structures in different formats. For documents in an noneditable format (e.g., PDF, picture format, etc.), existing systems may apply optical character recognition (OCR) with line detectors to infer table structures. For example, the system may identify horizontal or vertical lines that define the grids of the table structure, and then in turn extract contents within each identified grid as the cell value. However, when the table structure does not have any visible lines separating rows and columns, traditional methods of OCR with line detection may not apply.

BRIEF DESCRIPTION OF THE DRAWINGS

FIGS. 5A-5D are examples of a table structure illustrative of the method of identifying the table structure from the block of text shown in FIG. 4, according to embodiments described herein.

FIG. 11 is an example segment of a table structure from the block of text illustrating the process of identifying a column discussed in FIG. 10, according to embodiments described herein.

Figure 1:
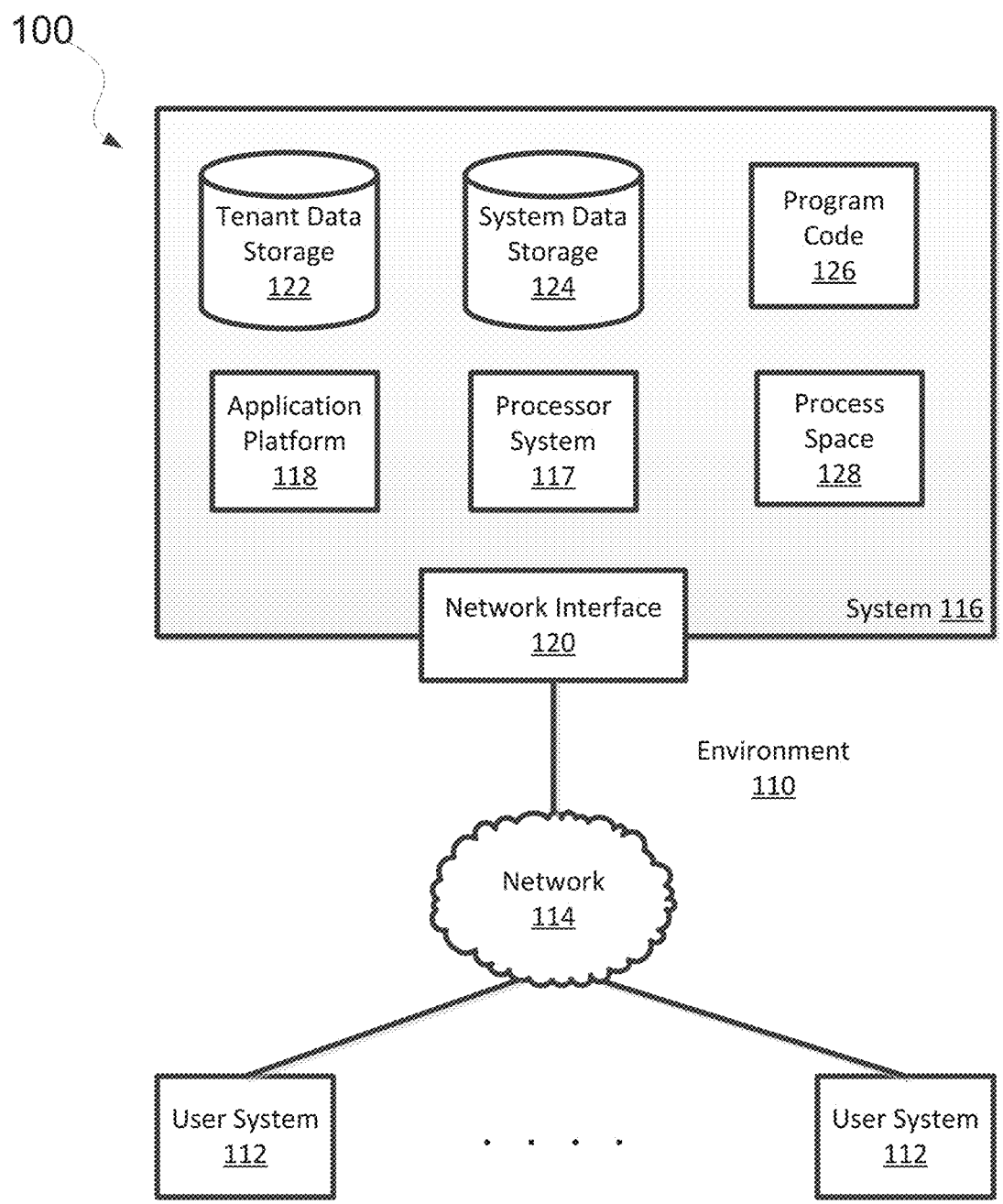
FIG. 1 illustrates a block diagram of an example environment wherein systems and methods for identifying a table structure based on the word density may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

In view of the need for a robust mechanism for table detection, embodiments described herein provide a word density-based clustering method to infer table structure from document. Specifically, a number of words are identified from a block of text (e.g., within a rectangular region) in an noneditable document, and the X-Y coordinates of each word relative to the rectangular region are identified. Based on the word density of the rectangular region, the words are grouped into clusters using a heuristic radius search method. For example, when the rectangular region is 100×200 units in size and has an average word density of 60%, two words that are less than a certain threshold (e.g., 5 units, etc.) apart in X-coordinate, are likely to be grouped into the same cluster. Words that are grouped into the same cluster are determined to be the element that belong to the same cell. In this way, the cells of the table structure can be identified. Once the cells are identified based on the word density of the block of text, the identified cells can be expanded horizontally or grouped vertically to identify rows or columns of the table structure.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
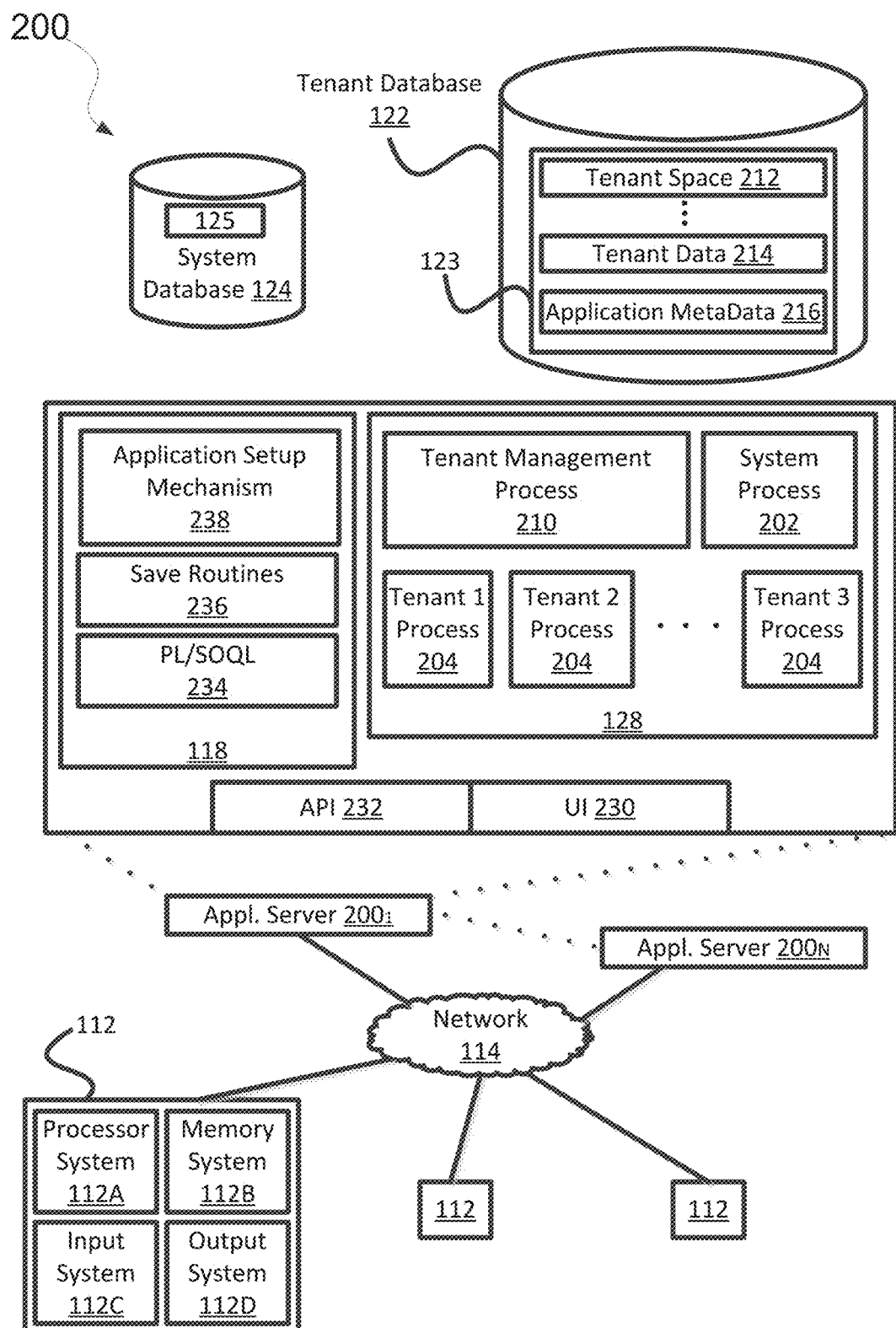
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5

Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a table identification module is provided for translating a natural language question to a database query that generates a value represents an answer to the natural language question. The table identification module may be installed or implemented at a computing device shown in FIG. 3.

Figure 3:
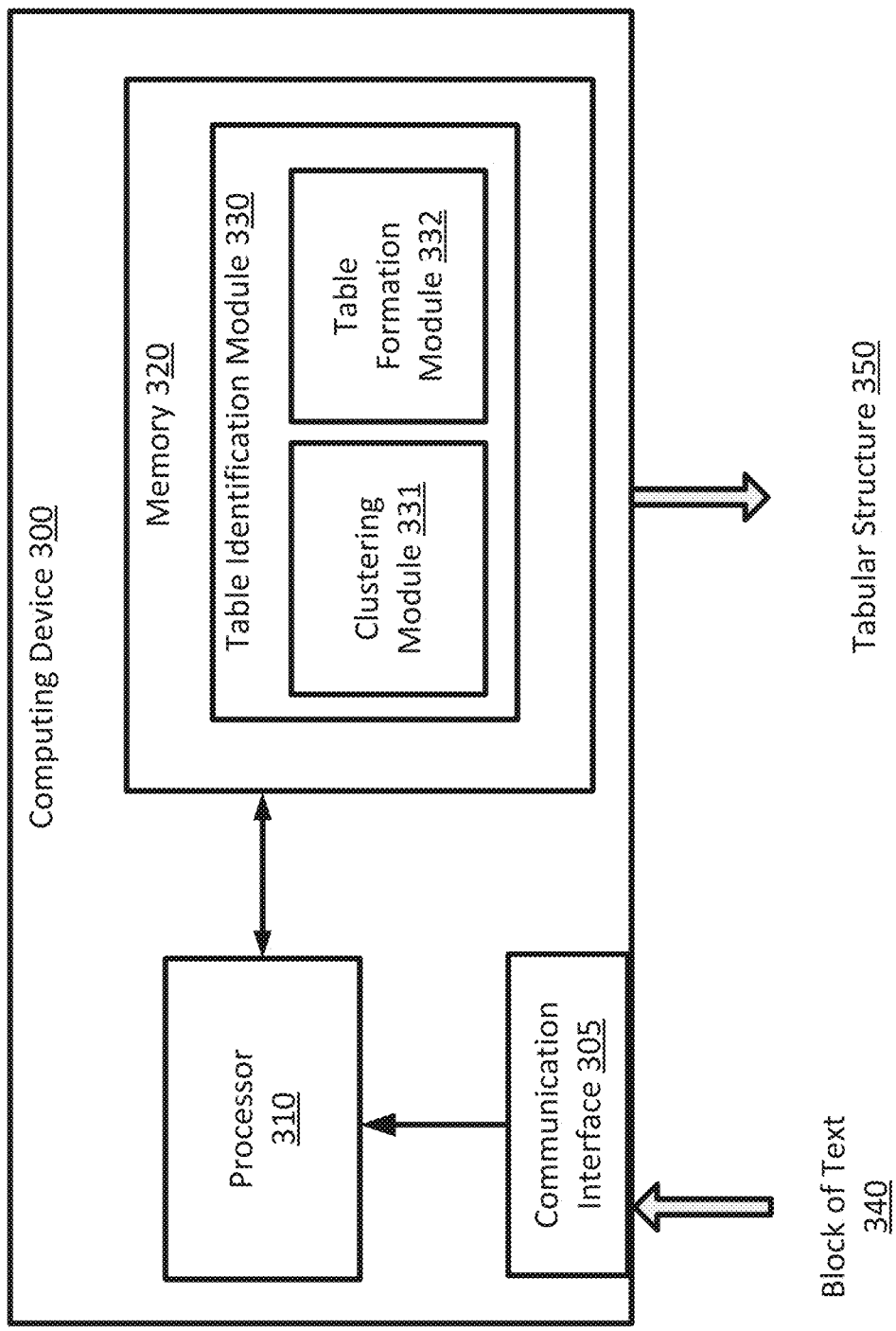
FIG. 3 is a simplified diagram of a computing device implementing unsupervised density-based table structure identification, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a table identification module 330 for identifying a table structure from an input document that contains a block of text 340, which potentially is related to a table, obtained via the communication interface 305. The table identification module 330 performs unsupervised identification to generate a table structure 350, which may include structural data elements defining to the input question 340. For example, the input document may be a noneditable file that contains a block of text 340, which may be indicated, e.g., by the caption, as a table.

The table identification module 330 further includes submodules such as the clustering module 331 and a table formation module 332. Specifically, the clustering module 331 is configured to perform OCR on the block of text 340 to identify a set of words and the spatial coordinates of each word with a rectangular region of the block of text, based on which the words are grouped into clusters. In this way, each cluster of words, e.g., words within a heuristic search radius based on the density of words within the block of text 340, is identified as a cell for the table. The table formation module 332 is configured to identify rows and columns based on the identified clusters of words, each of which is used as a cell of the table.

After implementing and executing the table identification module 330, in some embodiments, the output table structure 350 may take a variety of formats. For example, the output table structure 350 may be presented via a graphic user interface (GUI) as a table having lines separating columns and rows. For another example, the output table structure 350 may be presented in a specific data structure such as but not limited to an array, a linked list, and/or the like.

The output table structure 350 provided by module 330 is global for the multi-tenant database system, such as system 116, and applied to or used for all organizations or tenants whose users or customers utilize system 116 for data object generation, management, and use. Computing device 300 may receive or intake the input block of text 340 from a user of an organization or tenant accessing the database system. The input block of text 340 can be any type data in that it can take the form of a picture, a photo, a PDF file, a text document, etc. In some embodiments, the input block of text 340 is not constrained, restricted, or required to be in a particular form. Computing device 300 can receive the block of text 340 through a user interface, a communication interface 305 via a communication network, and/or the like.

Figure 4:
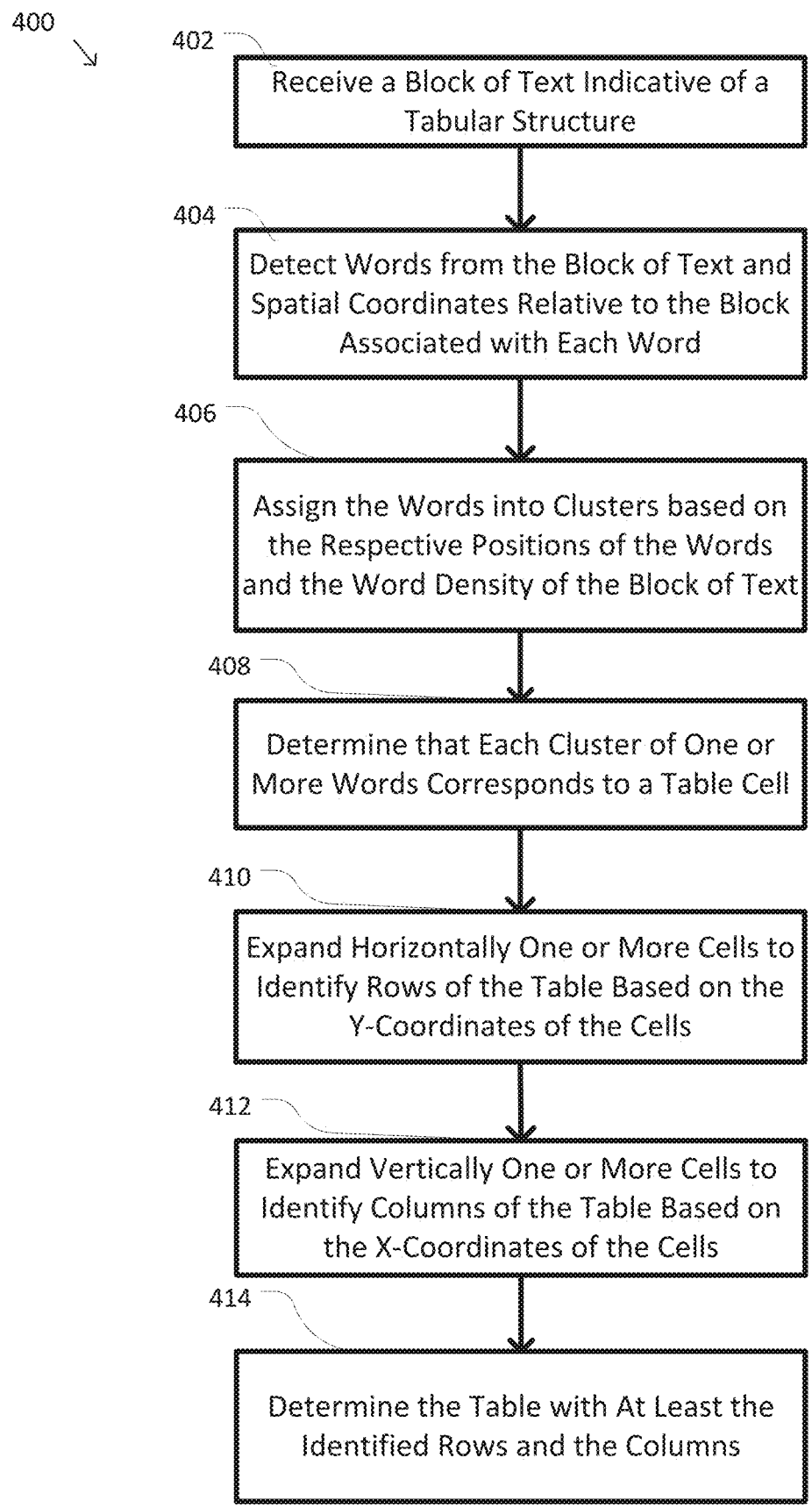
FIG. 4 is a simplified logic flow diagram illustrating a method for identifying a table structure from a block of text based on the word density of the block of text using the computing device shown in FIG. 3, according to embodiments described herein.

FIG. 4 is a simplified logic flow diagram illustrating a method 400 for identifying a table structure from a block of text based on the word density of the block of text using the computing device shown in FIG. 3, and FIGS. 5A-5D are examples of a table structure illustrative of the method 400 of identifying the table structure from the block of text shown in FIG. 4, according to embodiments described herein.

The example method 400 including processes 402-414 in FIG. 4 may be implemented, at least in part, in the form of executable code stored on non-transitory, tangible, machine-readable media that when run by one or more processors may cause the one or more processors to perform one or more of the processes 402-414. In some embodiments, these processes may correspond to the method used by the table identification module 330 to identify a table structure 350 from the input block of text 340.

At step 402, a block of text indicative of a table structure may be received, e.g., via communication interface 305. For example, the block of text may be part of a document, which has been identified as relating to a table, e.g., the block of text has been bounded by a rectangular region, or is associated with a caption that entitled "Table X," and/or the like.

At step 404, words may be detected from the block of text and the spatial coordinates associated with the words, relative to the block of text may be identified. For example, as shown by diagram 500a in FIG. 5A, OCR may be performed (e.g., by clustering module 331) on the block of text show at diagram 500a. Thus, each word and its respective position within the diagram 500a may be identified. For instance, the block of text shown at diagram 500a may contain words such as "Country/Heading" 501 at a start coordinate of (start X-coordinate, Y-coordinate)=(5, 5), and an end coordinate of (end X-coordinate, Y-coordinate)=(205, 5).

At step 406, the words are assigned into clusters based on the respective positions and the word density of the block of text. For example, words that are closer to each other relative to the size of the table, e.g., a detected rectangular region containing the block of text, are grouped into clusters, which can be converted to cells. A search radius heuristic in density-based clustering is derived using the scale of the document. For example, when the block of text has a size of 500×3000 pixels, and a total number of 50 words in the table, the search radius heuristic may be determined to be greater than 10 pixels and less than 60 pixels.

Each word may be assigned with a cluster ID which represents the cluster the word belongs to. For example, as shown by diagram 500a in FIG. 5A, the word "cohesion" 502, "fund" 503 and "EURbn" 504 may be assigned with the same cluster ID, as the three words 502-504 are spatially close, e.g., within a threshold distance horizontally. For another example, the word "Country/Heading" 501 is assigned to a different cluster ID from word "Cohesion" 502, as the difference in X-coordinates of two words 501 and 502 may exceed a threshold.

In some embodiments, the threshold may be determined based on the word density of block text 550a. For example, the word density may be proportional to the total scale of the block text 500a, e.g., 500×3000, divided by the total number of words within the block text 500a. As further discussed in relation to FIGS. 6-7, the word density-based heuristic search may be performed horizontally and/or vertically to identify clusters of words.

At step 408, each cluster of one or more words having the same cluster ID is determined to be a cell of the table. For example, starting from the left-most word, e.g., a word that has the smallest start X-coordinate, or has no word on the left, detection is at the start of the processing queue. Each word is processed by scanning its neighboring words horizontally and the neighboring words with same cluster ID are grouped together to form a row cell. As shown at diagram 500b in FIG. 5B, the word "Country/Heading" forms an individual cell 508, and words "Cohesion," "Fund" and "EURbn" form an individual cell 509 as the three words are assigned with the same cluster ID at step 406 (shown at 502-504 in FIG. 5A).

At step 410, one or more identified cells are expanded horizontally to form a row of the table along the same Y-coordinates of the cells. For example, as shown by diagram 500c of FIG. 5C, cell 508 may be expanded horizontally, along the same Y-coordinate=5, to include cell 509 which also has a Y-coordinate of 5. In this way, cells 508 and 509 are included into the same row 510. Further details of row formation are discussed in relation to FIGS. 8-9.

At step 412, one or more identified cells are expanded vertically to form a column of the table along the similar X-coordinates (e.g., within a range of threshold difference) of the cells. In some aspects, after the cells have been identified with clustering from step 408, the cells may be expanded to make the columns. For example, as shown by diagram 500d of FIG. 5D, cells 512, 514 and 515 may be expanded vertically, and the differences between the average X-coordinates of these cells are within a threshold range, e.g., cell 512 starts at X-coordinate=5, and ends at X-coordinate=205, cell 514 starts at X-coordinate=5, and ends at X-coordinate=95, and cell 515 starts at X-coordinate=5, and ends at X-coordinate=200. The three cells 512, 514 and 515 are thus all within the range of [0, 250] on the X-axis. In this way, cells 512, 514 and 515 are included into the same column. Further details of column formation are discussed in relation to FIGS. 10-11.

At step 414, the table is determined with at least the identified rows and the columns. For example, the table structure may be presented via a GUI as a table having lines separating columns and rows, as shown at 500d in FIG. 5D. For another example, the determined table may be associated with a specific data structure such as but not limited to an array, a linked list, and/or the like.

Figure 6:
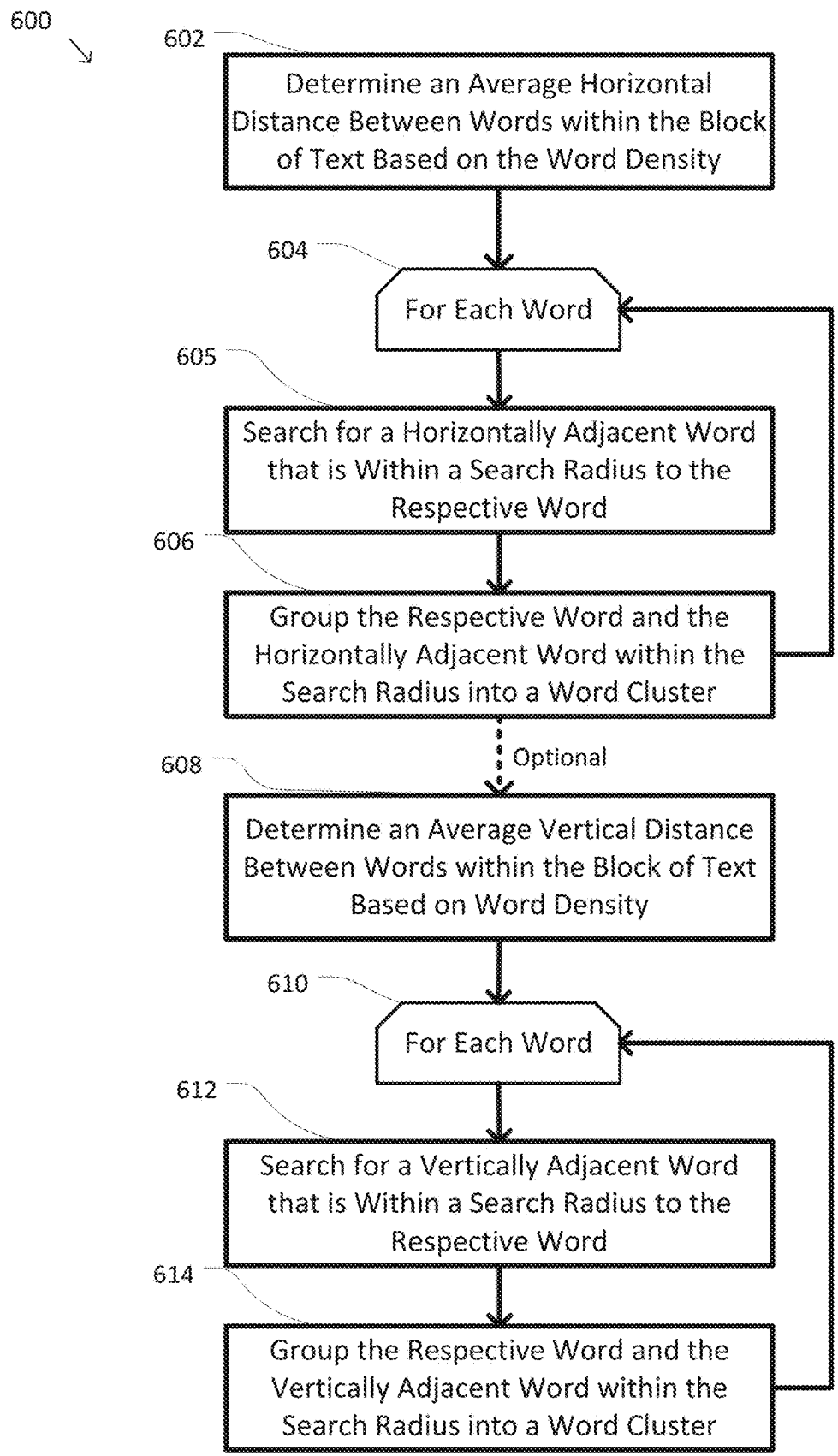
FIG. 6 is a simplified logic flow diagram illustrating details of identifying cells for the table structure as part of the method shown in FIG. 4, according to embodiments described herein.
Figure 7:
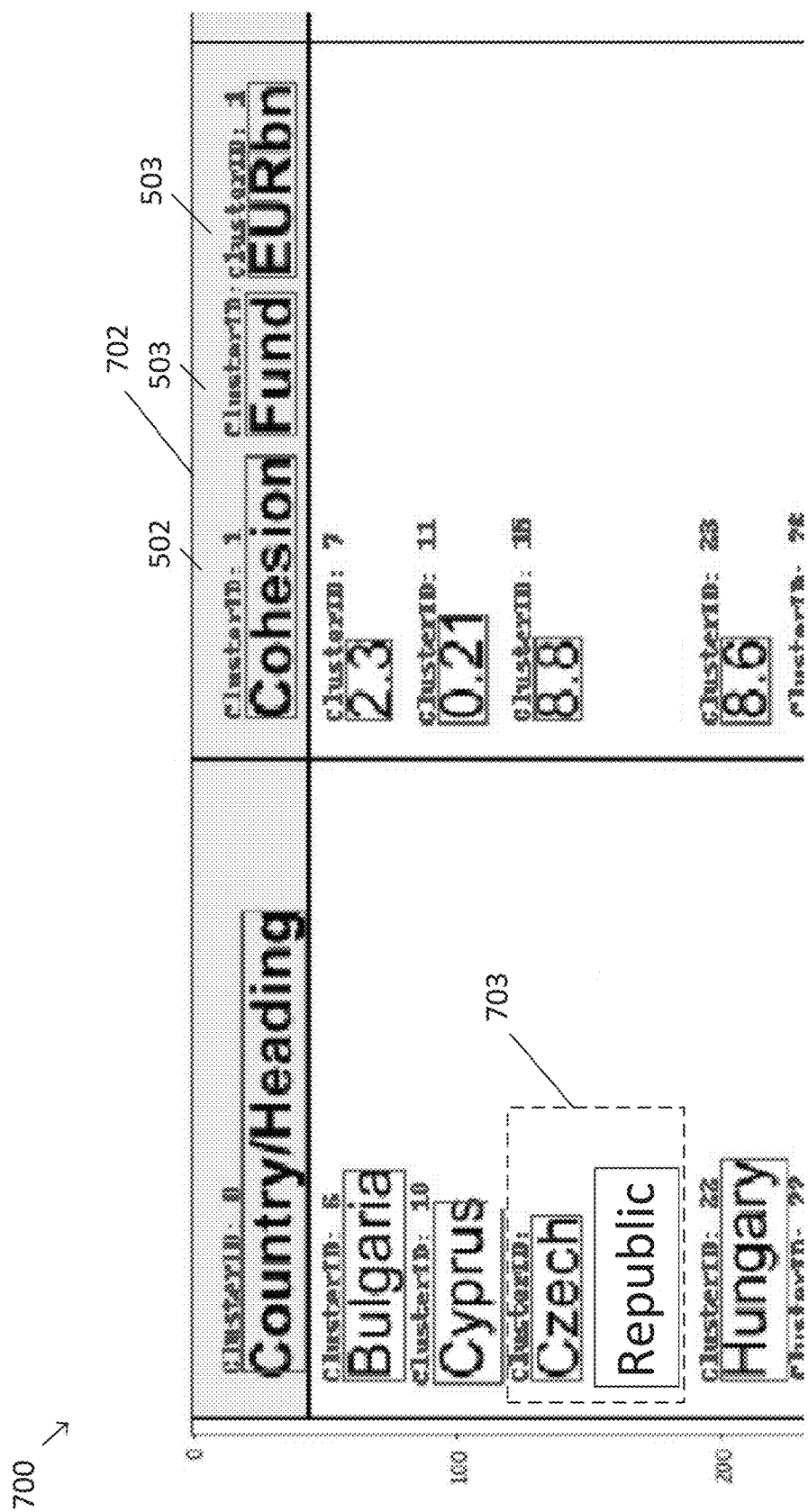
FIG. 7 is an example segment of a table structure from the block of text illustrating the process of identifying cells discussed in FIG. 6, according to embodiments described herein.

FIG. 6 is a simplified logic flow diagram illustrating details of a method 600 of identifying cells for the table structure as part of the method 400 shown in FIG. 4, and FIG. 7 is an example segment 700 of a table structure from the block of text illustrating the process 600 of identifying cells discussed in FIG. 6, according to embodiments described herein.

The example method 600 including processes 602-614 in FIG. 6 may be implemented, at least in part, in the form of executable code stored on non-transitory, tangible, machine-readable media that when run by one or more processors may cause the one or more processors to perform one or more of the processes 602-614. In some embodiments, these processes may correspond to the method used by the clustering module 331 to identify and cluster words from the input block of text 340.

At step 602, an average horizontal distance is determined between words within the block of text based on the word density. For example, the average horizontal distance may be computed based on the full scale of X-coordinate span of the block of text, and the actual X-coordinates of the words within the block.

At step 604, method 600 processes each word, by searching for a horizontally adjacent word that is within a search radius to the respective word at step 605. For example, when the average horizontal distance is 200 pixels, for each word, a neighboring range of ±average horizontal distance×1.5 (or any other number such as 1.2, 1.3, etc.) may be examined to identify a neighboring word. As shown in table segment 700 of FIG. 7, neighboring word 503 may be identified as within the horizontal distance threshold of word 502, and neighboring word 504 may be identified as within the horizontal distance threshold of word 503.

At step 606, the respective word and the horizontally adjacent word are grouped into a word cluster. In this way, when word 502 is processed, words 503 and 502 are grouped into the same cluster. Method 600 then moves on to process word 503, and words 503 and 504 are grouped into the same cluster 702. Thus, words 502, 503 and 504 are grouped into the same cluster 702 eventually.

Upon searching horizontally to group words into clusters, method 600 may optionally search vertically to group words. In a table structure, there is usually separation between rows. For example, in some situations, there may be a vertical separation space between adjacent rows. When the vertical distance between two words, e.g., "Czech" and "Republic" shown in FIG. 7, is less than any vertical separation space in other pairs of vertically adjacent cells, or a statistically obtained vertically separation distance based upon the size/scale of the table, the two words may likely belong to the same cell due to formatting. At step 608, an average vertical distance between words can be determined based on word density. For example, the average vertical distance may be computed based on the full scale of Y-coordinate span of the block of text, and the actual density of Y-coordinates of the words within the block.

At step 610, method 600 processes each word, by searching for a vertically adjacent word and horizontally adjacent that is within a search radius to the respective word at step 612. For example, starting from the word "Czech," the word "Republic" may be identified as vertically adjacent with a vertical distance less than the average vertical distance, and also within a horizontal distance range to the word "Czech." In this case, at step 614, the respective word "Czech" and the vertically adjacent word "Republic" are grouped into a word cluster 703.

Figure 8:
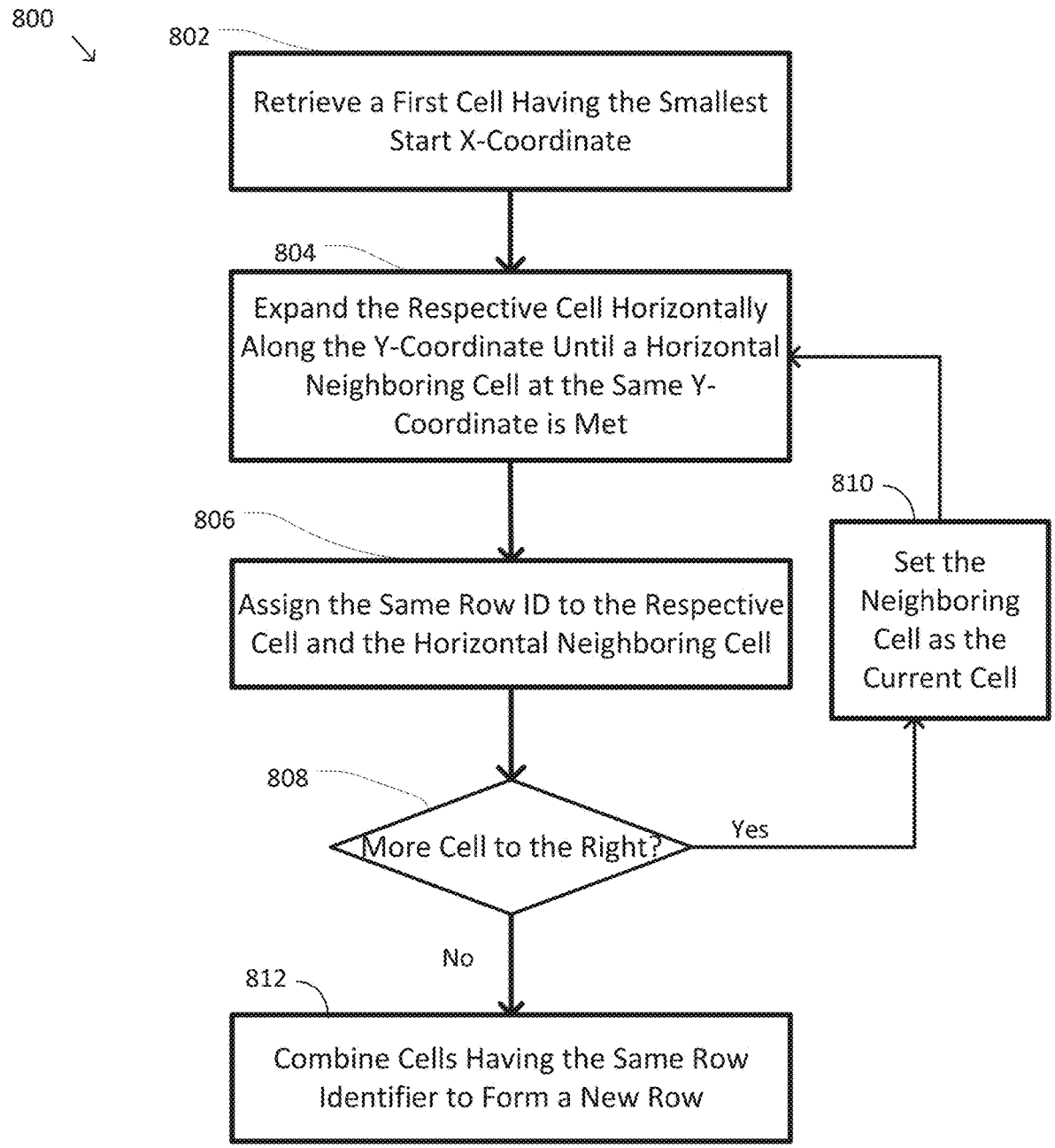
FIG. 8 is a simplified logic flow diagram illustrating details of expanding an identified cell horizontally to identify a row for the table structure as part of the method shown in FIG. 4, according to embodiments described herein.
Figure 9:
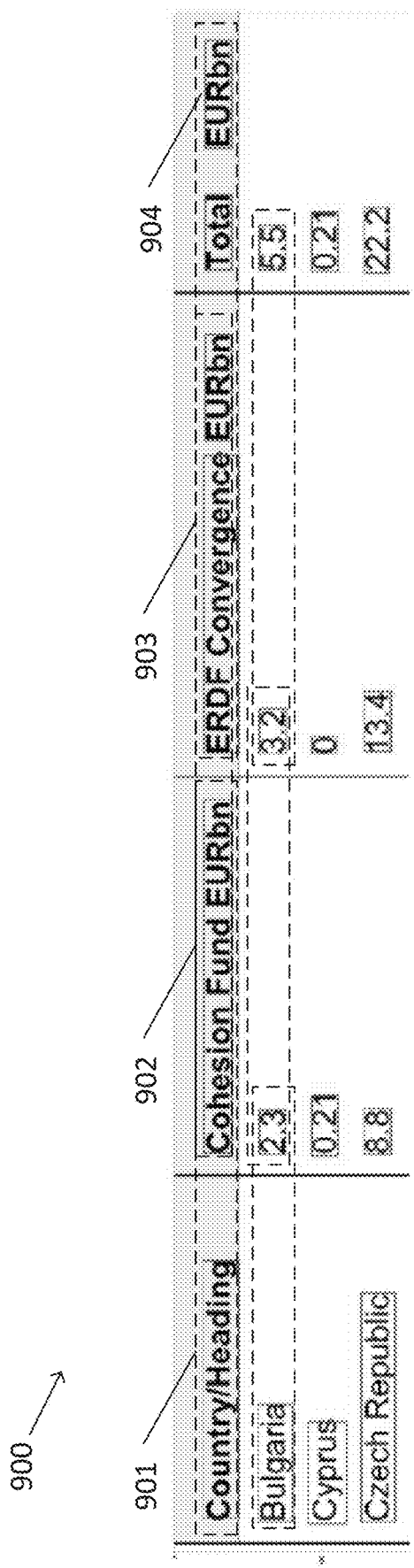
FIG. 9 is an example segment of a table structure from the block of text illustrating the process of identifying the row discussed in FIG. 8, according to embodiments described herein.

FIG. 8 is a simplified logic flow diagram illustrating method 800 of expanding an identified cell horizontally to identify a row for the table structure as part of the method 400 shown in FIG. 4, and FIG. 9 is an example segment 900 of a table structure from the block of text illustrating the process 800 of identifying the row discussed in FIG. 8, according to embodiments described herein.

The example method 800 including processes 802-812 in FIG. 8 may be implemented, at least in part, in the form of executable code stored on non-transitory, tangible, machine-readable media that when run by one or more processors may cause the one or more processors to perform one or more of the processes 802-812. In some embodiments, these processes may correspond to the method used by the table formation module 332 to identify rows of a table structure from the input block of text 340.

At step 802, a first cell having the smallest start X-coordinate may be retrieved, e.g., method 800 may start with processing the left-most cells such as cell 901 in table segment 900 of FIG. 9.

At step 804, the respective cell is expanded horizontally along the Y-coordinate until a horizontally neighboring cell at the same Y-coordinate is met. At step 806, the same row ID is then assigned to the respective cell and the horizontal neighboring cell. For example, as shown in FIG. 9, cell 901 can be expanded horizontally to the right at the same Y-coordinate to meet cell 902. Thus, cell 902 and cell 901 are assigned with the same row ID.

At step 808, method 800 determines whether there are more cells to the right to be processed. For example, when cell 902 is to the right of cell 901, method 800 proceed to cell 902 at step 810, and repeat steps 804 and 806. In this way, cell 903 is identified as a horizontal neighboring cell to cell 902, and cell 903 and cell 902 are assigned with the same row ID. Thus, by progressively moving to the right one by one, cells 901-904 will be assigned with the same row ID.

At step 808, when there is no more cell to the right of the current cell, e.g., there is no more cell to the right of cell 904, the cells having the same row ID are combined to form a new row. In this example, cells 901-904, all at the same Y-coordinate may be combined to form the new row.

Figure 10:
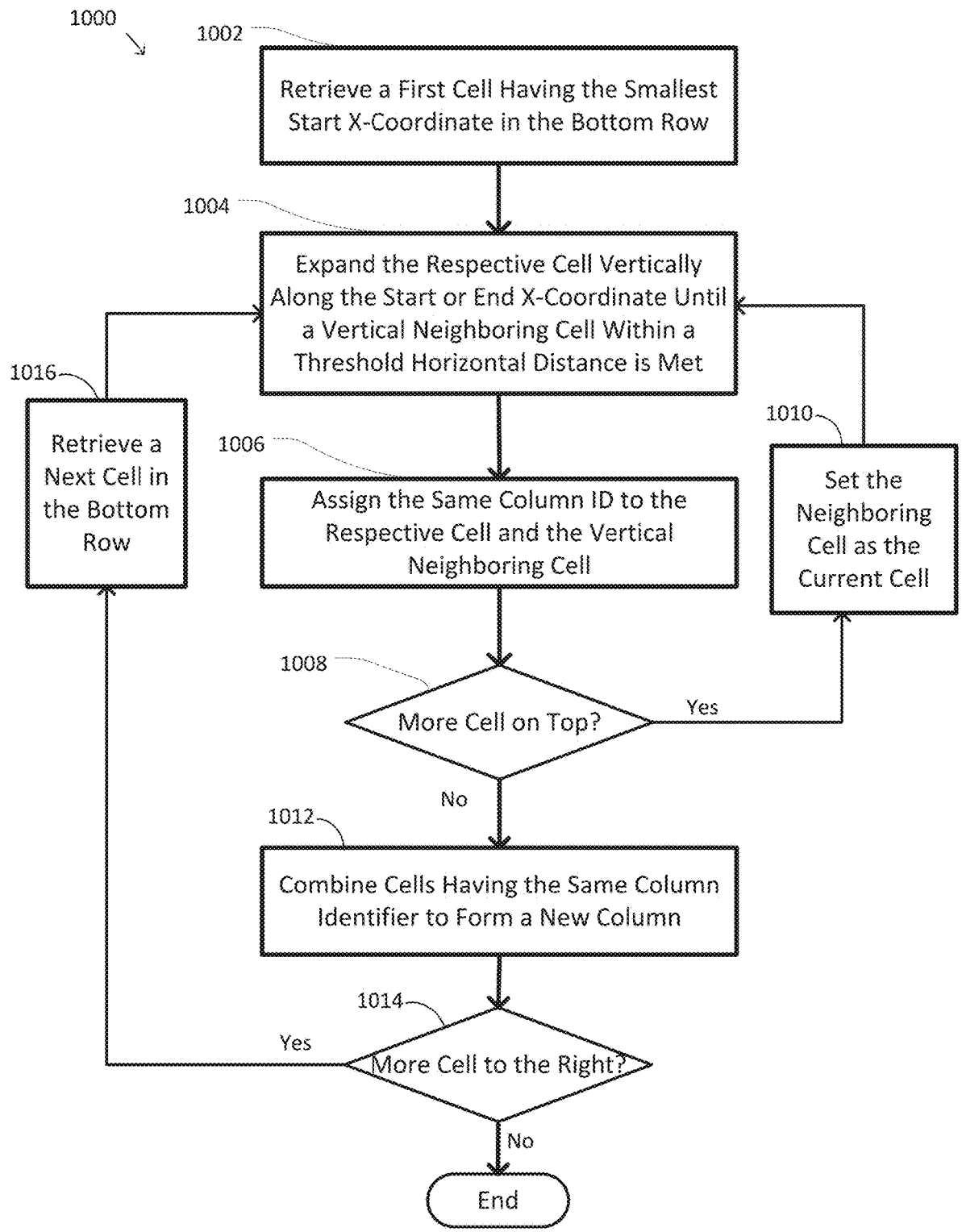
FIG. 10 is a simplified logic flow diagram illustrating details of expanding identified cells vertically to identify a column for the table structure as part of the method shown in FIG. 4, according to embodiments described herein.

FIG. 10 is a simplified logic flow diagram illustrating method 1000 of expanding identified cells vertically to identify a column for the table structure as part of the method 400 shown in FIG. 4, and FIG. 11 is an example segment 1100 of a table structure from the block of text illustrating the process 1000 of identifying a column discussed in FIG. 10, according to embodiments described herein.

The example method 1000 including processes 1002-1014 in FIG. 10 may be implemented, at least in part, in the form of executable code stored on non-transitory, tangible, machine-readable media that when run by one or more processors may cause the one or more processors to perform one or more of the processes 1002-1014. In some embodiments, these processes may correspond to the method used by the table formation module 332 to identify columns of a table structure from the input block of text 340.

At step 1002, a first cell having the smallest start X-coordinate in the bottom row is retrieved. For example, as shown at diagram 1100 in FIG. 11, method 1000 may start with the left-most cell 1101 in the bottom row.

At step 1004, the respective cell is expanded vertically along the start or the end X-coordinate until a vertical neighboring cell within a threshold horizontal distance is met. For example, the threshold horizontal distance may be defined in a similar way as in step 602 in in FIG. 6. In this way, from cell 1101, method 1000 may identify a vertical neighboring cell 1106 that is within a range of horizontal distance to the cell 1101.

At step 1106, the same column ID is then assigned to the respective cell (e.g., cell 1101) and the vertically neighboring cell (e.g., cell 1106).

At step 1108, method 1000 determines whether there is more cell on top of the current cell. For example, as there is at least one cell 1106 on top of cell 1101, method 1000 proceeds to step 1010 to set the neighboring cell (e.g., 1106) as the current cell and repeats steps 1004-1008.

At step 1012, cells having the same column ID are combined to form a new column.

In some embodiments, as words in cells may not be horizontally aligned, e.g., cell 1101 is aligned to the right of the cell, while the rest of the cells of the same column are aligned to the left. In this case, as steps 1004-1008 progressively search vertically upward to determine whether a cell on top of a current cell is within a horizontal range, method 1000 would identify cell 1104 as a vertical neighbor of cell 1102. For example, starting from the bottom cell "Poland" 1101, method 1000 searches upward for the cell "Malta" 1106 as a vertically adjacent cell to cell 1101. Method 1000 continues to search upward to locate cell "Lithuania" as vertically adjacent to cell "Malta," and so on, until at cell "Country/Heading," method 1000 may determine that there is no more cell on top of cell "Country/Heading." In this case, method 1000 may restart at the bottom row with the next cell "22" that is to the right of cell "Poland" 1101 to search upwardly for defining a new column. In this way, method 1000 may process columns from left to the right and may identify the left most cell that has not been identified as belonging to an identified column as the vertical neighbor. For example, for cell 1102, while method 1000 searches upward for a vertical neighbor, although cell 1103 may also be within a horizontal range to cell 1101, method 1000 may choose the left-most cell, e.g., cell 1104 as the vertical neighbor to cell 1102. In this way, method 1000 may avoid confusing cells from the column to the right with cells of the current column while the cells may not be aligned.

At step 1014, method 1000 may determine whether there is more cell to the right of the currently identified column. When no more cell needs to be processed, all the columns of the table structure has been defined. When there is more cell to be processed, method 1000 proceeds to step 1016 to retrieve a next cell in the bottom row, and again starts from the bottom row to search upward, repeating steps 1004-1012 to define the next column until all columns are defined.

In some embodiments, upon defining the rows and columns of the table structure, the top row may be identified as the header row, e.g., when the data values of the cells in the top row are in a different format from the data values in the rest of the table. For example, as shown at 1100, as the top row contains cells of strings such as "Country/Heading," "Cohesion Fund EURbn," cells in the column under the cell "Cohesion Fund EURbn" contain numeric values. In this regard, the top row may be identified as the header row of the table.

Some examples of computing devices, such as computing device 300, may include non-transitory, tangible, machine readable media that include executable code that when run by one or more processors (e.g., processor 310) may cause the one or more processors to perform the processes of methods 700-900. Some common forms of machine readable media that may include the processes and sub-processes of methods 700-900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for identifying a table structure from a document, the method comprising:
receiving, via an interface, a document containing a block of text;
detecting a plurality of words within the block of text, each word being associated with a set of spatial coordinates indicating a respective position of the respective word within the block of text;
assigning the plurality of words into a plurality of clusters based on the respective positions of the plurality of words and a word density of the block of text;
determining that each cluster that contains one or more words corresponds to a cell of a table;
expanding, horizontally, a first set of cells to form a row of the table based on one or more first spatial coordinates indicating a vertical position of the first set of cells;
expanding, vertically, a second set of cells to form a column of the table based on one or more second spatial coordinates indicating a horizontal position of the second set of cells; and
determining the table with at least the identified row and the identified column.

2. The method of claim 1, wherein the assigning the plurality of words into a plurality of clusters based on the respective positions of the plurality of words and the word density of the block of text further comprising:
determining an average space between words within the block of text based on a word density of the block of text;
for each word from the plurality of words:
searching for an adjacent word that is within a search radius to the respective word, wherein the search radius is derived from the average space between words based on a relative size of a table containing the block of text; and
grouping the respective word and the adjacent word that is within the search radius into a word cluster.

3. The method of claim 2, wherein the determining the average space between words within the block of text based on the word density of the block of text comprises:
determining an average horizontal distance between words within the block of text; and
using the average horizontal distance as a first search radius for horizontally searching for the adjacent word that is horizontally aligned with and within the first search radius to the respective word.

4. The method of claim 2, wherein the determining the average space between words within the block of text based on the word density of the block of text comprises:
determining an average vertical distance between words within the block of text; and
using the average vertical distance as a second search radius for vertically searching for the adjacent word that is vertically aligned with and within the second search radius to the respective word.

5. The method of claim 2, wherein the determining the average space between words within the block of text based on the word density of the block of text comprises:
determining a size of a rectangular region containing the block of text;
determining a total number of words of the plurality of words within the block of text; and
computing the average space between words based on the total number of words and the size of the rectangular region.

6. The method of claim 1, wherein the expanding, horizontally, the first set of cells to form the row of the table based on one or more first spatial coordinates indicating the vertical position of the first set of cells comprises:
for each cell from the first set of cells:
expanding the respective cell horizontally along the vertical spatial coordinate of the respective cell until a horizontal neighboring cell at a same vertical spatial coordinate is met, and
assigning a same row identifier to the respective cell and the horizontal neighboring cell; and
combining cells having the same row identifier to form one or more rows.

7. The method of claim 1, wherein the expanding, vertically, the second set of cells to form the column of the table based on one or more second spatial coordinates indicating the horizontal position of the second set of cells comprises:
for each cell from the second set of cells, retrieving a start horizontal spatial coordinate and an end horizontal spatial coordinate associated with the respective cell;
identifying at least one cell having a smallest start horizontal spatial coordinate among the second set of cells;

searching for a first subset of cells whose horizontal distance to the one at least one cell is less than a threshold derived from the word density of the block of text; and determining that the first subset of cells form a first column of the tabular structure.

8. The method of claim 7, further comprising:

retrieving a largest end horizontal spatial coordinate among cells within the first column;

starting, from the largest end horizontal spatial coordinate, to search for a second subset of cells whose horizontal distance to the largest end horizontal spatial coordinate is less than the threshold derived from the word density of the block of text; and determining that the second subset of cells form a second column of the tabular structure next to the first column.

9. The method of claim 7, wherein the threshold derived from the word density of the block of text is determined by an average horizontal distance between identified cells of the block of text.

10. The method of claim 1, further comprising:

in response to determining that a first set of clusters of words in a top row contain words having a different format than a second set of clusters of words in a different row, determining that the top row is a header row of the tabular structure.

11. A system for identifying a table structure from a document, the system comprising:

a communication interface that receives a document containing a block of text;

a memory containing machine readable medium storing machine executable code; and one or more processors coupled to the memory and configurable to execute the machine executable code to cause the one or more processors to:

detect a plurality of words within the block of text, each word being associated with a set of spatial coordinates indicating a respective position of the respective word within the block of text;

assign the plurality of words into a plurality of clusters based on the respective positions of the plurality of words and a word density of the block of text;

determine that each cluster that contains one or more words corresponds to a cell of a table;

expand, horizontally, a first set of cells to form a row of the table based on one or more first spatial coordinates indicating a vertical position of the first set of cells;

expand, vertically, a second set of cells to form a column of the table based on one or more second spatial coordinates indicating a horizontal position of the second set of cells; and determine the table with at least the identified row and the identified column.

12. The system of claim 11, wherein the one or more processors are configurable to execute the machine executable code to cause the one or more processors to assign the plurality of words into a plurality of clusters based on the respective positions of the plurality of words and the word density of the block of text by:

determining an average space between words within the block of text based on a word density of the block of text;

for each word from the plurality of words:

searching for an adjacent word that is within a search radius to the respective word, wherein the search radius is derived from the average space between words based on a relative size of a table containing the block of text; and grouping the respective word and the adjacent word that is within the search radius into a word cluster.

13. The system of claim 12, wherein the one or more processors are configurable to execute the machine executable code to cause the one or more processors to determine the average space between words within the block of text based on the word density of the block of text by:

determining an average horizontal distance between words within the block of text; and using the average horizontal distance as a first search radius for horizontally searching for the adjacent word that is horizontally aligned with and within the first search radius to the respective word.

14. The system of claim 12, wherein the one or more processors are configurable to execute the machine executable code to cause the one or more processors to determine the average space between words within the block of text based on the word density of the block of text by:

determining an average vertical distance between words within the block of text; and using the average vertical distance as a second search radius for vertically searching for the adjacent word that is vertically aligned with and within the second search radius to the respective word.

15. The system of claim 12, wherein the one or more processors are configurable to execute the machine executable code to cause the one or more processors to determine the average space between words within the block of text based on the word density of the block of text by:

determining a size of a rectangular region containing the block of text;

determining a total number of words of the plurality of words within the block of text; and computing the average space between words based on the total number of words and the size of the rectangular region.

16. The system of claim 11, wherein the one or more processors are configurable to execute the machine executable code to cause the one or more processors to expand, horizontally, the first set of cells to form the row of the table based on one or more first spatial coordinates indicating the vertical position of the first set of cells by:

for each cell from the first set of cells:

expanding the respective cell horizontally along the vertical spatial coordinate of the respective cell until a horizontal neighboring cell at a same vertical spatial coordinate is met, and assigning a same row identifier to the respective cell and the horizontal neighboring cell; and combining cells having the same row identifier to form one or more rows.

17. The system of claim 11, wherein the one or more processors are configurable to execute the machine executable code to cause the one or more processors to expand, vertically, the second set of cells to form the column of the table based on one or more second spatial coordinates indicating the horizontal position of the second set of cells by:

for each cell from the second set of cells, retrieving a start horizontal spatial coordinate and an end horizontal spatial coordinate associated with the respective cell;

identifying at least one cell having a smallest start horizontal spatial coordinate among the second set of cells;

searching for a first subset of cells whose horizontal distance to the one at least one cell is less than a threshold derived from the word density of the block of text; and determining that the first subset of cells form a first column of the tabular structure.

18. The system of claim 17, wherein the one or more processors are configurable to execute the machine executable code to cause the one or more processors further to:

retrieve a largest end horizontal spatial coordinate among cells within the first column;

start, from the largest end horizontal spatial coordinate, to search for a second subset of cells whose horizontal distance to the largest end horizontal spatial coordinate is less than the threshold derived from the word density of the block of text; and determine that the second subset of cells form a second column of the tabular structure next to the first column.

19. The system of claim 17, wherein the threshold derived from the word density of the block of text is determined by an average horizontal distance between identified cells of the block of text.

20. The system of claim 11, wherein the one or more processors are configurable to execute the machine executable code to cause the one or more processors further to:

in response to determining that a first set of clusters of words in a top row contain words having a different format than a second set of clusters of words in a different row, determine that the top row is a header row of the tabular structure.

\* \* \* \* \*